United States Patent
Fiessler

(10) Patent No.: US 6,677,574 B2
(45) Date of Patent: Jan. 13, 2004

(54) PROTECTIVE DEVICE FOR MACHINES SUCH AS BENDING PRESSES, CUTTING MACHINES, PUNCHING MACHINES OR THE LIKE

(75) Inventor: Lutz Fiessler, Aichwald (DE)

(73) Assignee: Fiessler Elektronik OHG, Esslingen (DE)

( * ) Notice: Subject to any disclaimer, the term of this patent is extended or adjusted under 35 U.S.C. 154(b) by 0 days.

(21) Appl. No.: 10/048,545

(22) PCT Filed: May 16, 2001

(86) PCT No.: PCT/EP01/05543

§ 371 (c)(1),
(2), (4) Date: Jan. 31, 2002

(87) PCT Pub. No.: WO01/92777

PCT Pub. Date: Dec. 6, 2001

(65) Prior Publication Data

US 2002/0104958 A1 Aug. 8, 2002

(30) Foreign Application Priority Data

May 31, 2000 (DE) .......................................... 100 27 156

(51) Int. Cl.[7] .............................. G06M 7/00; H01J 40/14
(52) U.S. Cl. ............... 250/221; 250/222.1; 250/559.12; 250/559.29; 340/555
(58) Field of Search ............................ 250/221, 221.1, 250/559.12, 559.13, 559.29, 559.38; 340/555, 556, 557; 356/638

(56) References Cited

U.S. PATENT DOCUMENTS

| | | | | |
|---|---|---|---|---|
| 4,166,369 A | * | 9/1979 | Nakajima | 72/21.1 |
| 4,527,684 A | * | 7/1985 | Eggeman et al. | 192/130 |
| 4,660,703 A | * | 4/1987 | Filcich et al. | 192/130 |
| 4,907,432 A | * | 3/1990 | Maillefer | 72/1 |
| 5,032,716 A | * | 7/1991 | Lam et al. | 250/221 |
| 5,579,884 A | * | 12/1996 | Appleyard et al. | 192/130 |
| 6,091,339 A | * | 7/2000 | Chuang et al. | 250/222.1 |
| 6,243,011 B1 | * | 6/2001 | Rostroem | 250/559.13 |
| 6,316,763 B1 | * | 11/2001 | Appleyard et al. | 250/221 |
| 6,389,860 B1 | * | 5/2002 | Stalzer | 72/1 |
| 2002/0134922 A1 | * | 9/2002 | Appleyard et al. | 250/221 |
| 2002/0170401 A1 | * | 11/2002 | Fiessler | 83/74 |
| 2003/0024421 A1 | * | 2/2003 | Braune et al. | 250/221 |

FOREIGN PATENT DOCUMENTS

| | | |
|---|---|---|
| DE | 27 50 234 B1 | 1/1979 |
| DE | 197 17 299 A1 | 2/1998 |
| EP | 0 146 460 A2 | 6/1985 |
| EP | 0 264 349 B1 | 4/1988 |
| WO | WO 97/25568 A1 | 7/1997 |

\* cited by examiner

*Primary Examiner*—Christopher W. Fulton
*Assistant Examiner*—Yaritza Guadalupe
(74) *Attorney, Agent, or Firm*—Browdy and Neimark, P.L.L.C.

(57) ABSTRACT

A guard means for machines, more particularly pressbrakes, guillotines, stamping machines and the like in the case of which a first machine part (10) performs working movements toward a second machine part (11). Between the machine parts a photoelectric detector arrangement {19 and 20) is positioned and is attached to the moving machine part (10), a stop means being adapted to halt working motion of the moving machine part on interruption of a light beam. A control means for the working movement of the moving machine part (10) reduces the speed immediately prior to light beam interruption by the other machine part (11) to below a threshold limit speed.

By means of a speed measuring means (25 and 26) the working speed is measured and the stop means is deactivated below the predetermined threshold limit speed at least partially in order to be able to complete the working movement even in the case of interruption of the light beam by the other machine part (11). Such a speed measuring means may be also fitted externally to existing plant in a simple manner.

14 Claims, 2 Drawing Sheets

PROTECTIVE DEVICE FOR MACHINES SUCH AS BENDING PRESSES, CUTTING MACHINES, PUNCHING MACHINES OR THE LIKE

The invention relates to a guard means for machines, more particularly pressbrakes, guillotines, stamping machines and the like in the case of which a first machine part performs working movements toward a second machine part, comprising a photoelectric detector arrangement positioned between the machine parts and attached to the moving machine part, a stop means adapted to halt working motion of the moving machine on interruption of a light beam and a deactivating means adapted to deactivate, at least directly prior to interruption of the light beam by the other machinepart, the stop means.

Such guard means are disclosed in connection with pressbrakes for example in the German patent publication 2,750,234, the European patent publication 0 264 347 B the European patent publication 0 146 460 A or the German patent publication 19,717,299 A. In the case of known guard means it is conventional for position monitoring valves to be employed to control the hydraulic drive of the moving machine part. Switching over the rapid working movement to the slower working motion below the predetermined threshold speed immediately before reaching the other machine part is effected by resetting the valves' positions. Sensors monitor the valve position or other corresponding positions and then effect, on reaching the corresponding position, deactivation of the stop means or, respectively, of the photoelectric detector arrangement.

It is more especially in the case of older machines that upgrading modification of the machines themselves are necessary to mount the necessary sensors and to adjust same, this being a slow expensive process requiring some redesigning.

One object of the present invention is to so improve a guard means of the type initially mentioned that the deactivation of the stop means may be performed in a simpler fashion using devices, which may be readily mounted on existing plant without need for adjustment.

In accordance with the invention this object is attained because a speed measuring means for the moving machine part is provided and the deactivating means comprises means for at least partly deactivating the stop means below a predetermined threshold speed, a control means for the working movement of the moving machine part being adapted to reduce the speed immediately prior to interruption of the light beam by the other machine part to a speed below the threshold speed.

Owing to use of plain speed monitoring and speed control there is no need for later adjustment in position so that even for example in the case of modifications of the photoelectric detector arrangement no modification of the deactivating device will be necessary. A speed measuring means may be mounted in a simple manner externally on the machine or internally on the moving machine part. The possibilities for control variations are substantially more extensive in the case of the speed controlled guard means.

The dependent claims define features which represent advantageous developments and improvements of the guard means defined in claim 1.

It is advantageous for the deactivating means to possess means for deactivating the stop means when machine parts are moving apart, that is to say on the detection of negative speed values, since here there is no danger. In this respect the deactivating means may, in accordance with an advantageous form of the invention, be designed with means for storage of that position, at which the threshold speed is not reached during working movement and for deactivating the stop means until such position is reached again on the return motion of the moving machine part. This means that the deactivating means or, respectively, the photoelectric detector cannot be activated, when in the course of a return movement the moving machine part stops short of the stored position, something which otherwise would lead to activating the photoelectric detector arrangement and corresponding triggering of an undesired function.

In order to increase safety the speed measuring means comprises at least two independently operating measurement modules arranged at different positions, more particularly at two oppositely placed terminal portions of the moving machine part. This enhanced safety is more particularly produced by a comparison means for the data from the measurement modules and by means of the deactivating means for preventing deactivating of the stop means in the case of there being a no longer tolerable departure between data from the measurement module. Additionally it is possible in the case of discrepant data it is advantageously possible to prevent an entire operating movement of the moving machine part, something which also serves to increase safety.

In accordance with an advantageous design means are provided for the automatic detection of the overrun of the moving machine part following a stop signal at least in the case of the first operating movement, the deactivating means possessing means for preventing deactivation of the stop means on exceeding a predetermined maximum predetermined and allowable overrun distance. This measurement as well contributes to increasing safety and in this case as well additionally a complete working movement of the moving machine part may be prevented.

The means for automatically finding overrun preferably repeat such detection for each successive working movement until a permissible overrun distance has been detected. This means that operation of the machine with an excessive overrun distance is effectively prevented.

The speed measuring means preferably comprises at least one measurement module which possesses an incremental angular displacement sensor with a cable pulling means and/or an inductive sensor detecting the movement of a magnetic strip, a differentiating means being preferably provided for conversion of displacement signals into speed signals. Accordingly it is possible for position signals and speed signals to be produced by the same measurement module.

One working example of the invention is represented in the drawings and will be explained in the following description in detail.

FIG. 1 diagrammatically shows a pressbrake fitted with a speed controlled guard means in a longitudinal lateral elevation as a working example of the invention.

Figure 1:
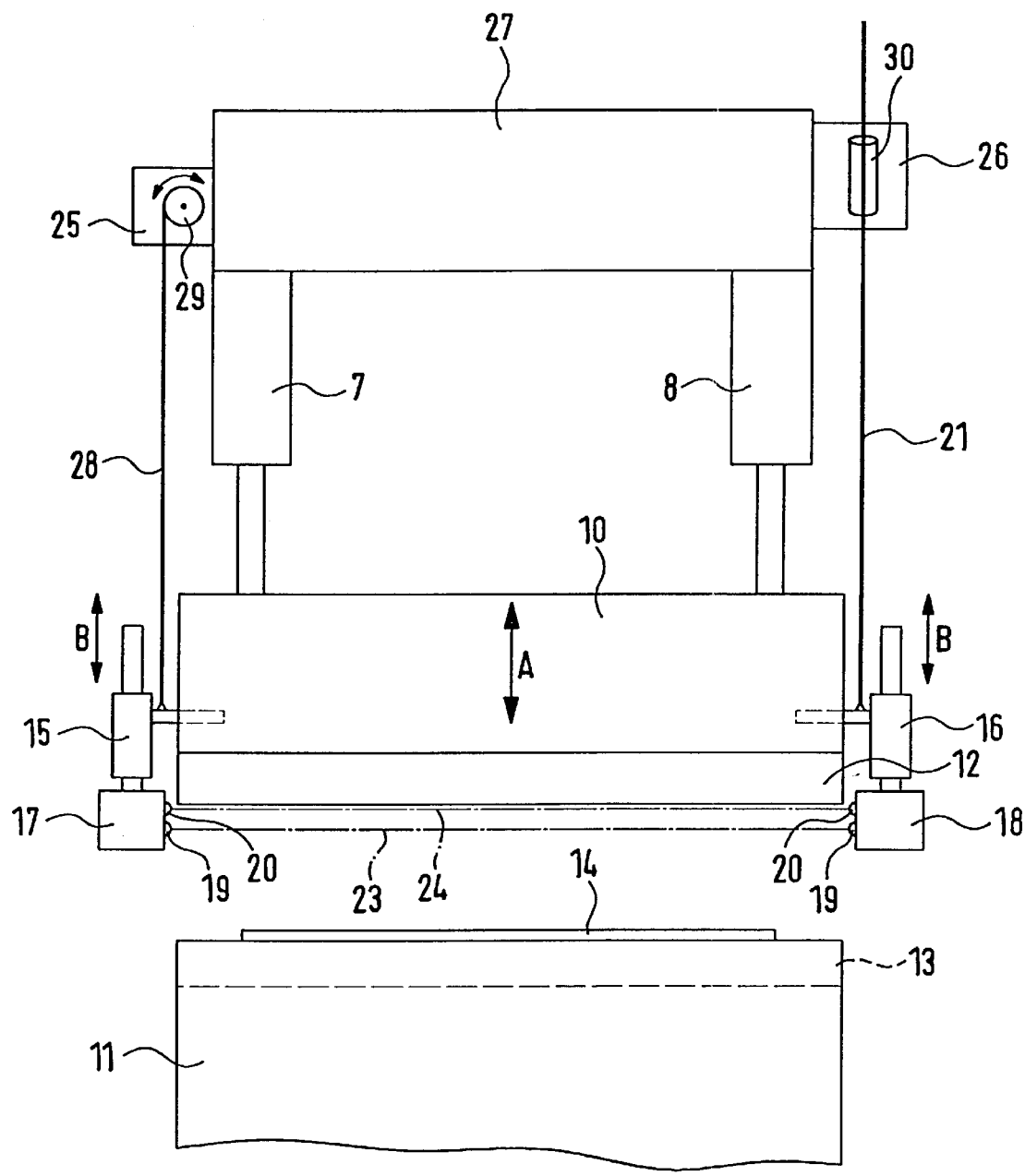

The pressbrake illustrated in FIG. 1 essentially comprises a top tool 10, which is able to be moved by means of hydraulic cylinders 7 and 8 toward a stationary bottom tool 11. The opposite working movement direction A is marked by a double arrow. In the case of an alternative design it would naturally be possible for the top tool to be stationary and for the bottom tool to be the moving tool. The plate-like, elongated top tool 10 possesses a working portion 12 with a wedge-like cross section, whereas the bottom tool 11 has a correspondingly wedge-like groove 13, into which the working portion 12 plunges during working movement and accordingly bends or angles the sheet metal 14, supported on the bottom tool 11.

The remaining parts of the inherently known pressbrake are not illustrated in order to make the drawing more straightforward. In the initially mentioned prior art further details of such a pressbrake are to be found. The cross sectional configuration of the working portion 12 and of the groove 13 may naturally be varied.

Respectively adjacent to mutually opposite narrow sides of the top tool 10 guides 15 and 16 are attached, in which holding means 17 and 18 for photoelectric detectors 19 and 20 are able to be moved as part of a vertical setting movement, whose direction is represented by double arrows B and which corresponds to the working direction A of motion. Each of the photoelectric detectors 19 and 20 comprises, in known manner, a laser transmitter and laser receiver, it being possible to reduce the number of transmitters by utilizing beam splitters or beam spreading means as is more particularly described in detail in the said German patent publication 19,717,299 A.

The first photoelectric detector 19 and the second photoelectric detector 20 are so arranged one above the other that same essentially lie in the plane of motion of the line of bending, that is to say the tip of the working range 12 of the top tool 10. In this case the photoelectric detector 19 primarily serves as a guard photoelectric detector, whereas the photoelectric detector 20 primarily serves as an adjustment photoelectric detector and is arranged between the photoelectric detector 19 and the top tool 10. Further photoelectric detectors may be provided however arranged in parallelism to the direction A of operating movement between such two photoelectric detectors 19 and 20 or perpendicularly to such working direction A of movement, as is described in detail in the initially mentioned prior art. In lieu of laser photoelectric detectors it is naturally possible to employ other known types of photoelectric detectors or other optical guard means.

The guard function of the photoelectric detector arrangement is that between the top tool 10 and the bottom tool 11 the closing action is abruptly halted, if one of the laser beams 23 and 24 of the photoelectric detectors 19 and 20 is interrupted, that is to say should some object happen to be in the path of motion. Since such pressbrakes or similar machines are conventionally operated by hand, there is more especially a danger of the operator's hand or arm being in the path of the working movement, something which might possibly lead to it being crushed or even severed from the body. Since arrest of the closing movement is also possible after a certain braking displacement, the distance between the laser beam 23 and the laser beam 24 should be so dimensioned that anything finding its way into the path of movement is not trapped or crushed. It will normally amount to 10 to 20 mm, for example. As regards the description of adjustment of the photoelectric detector arrangement attention is called to the initially mentioned prior art, since such adjustment is not as such part of the present invention.

The speed measuring means for the speed of the top tool 10 comprises two measuring modules 25 and 26, which are arranged on a diagrammatically represented machine frame 27 in a stationary manner. This machine frame 27 furthermore bears the hydraulic cylinders 7 and 8 for moving the top tool 10.

The left hand measuring module 25 is designed in the form of an incremental angle or rotation sensor in the case of which a cable 28 attached to the guide 15, that is to say to the top tool, is wound and unwound on a pulley 29 or drum in the course of motion of the top tool 10. The angular displacement of the pulley 29 is detected by a conventional angular incremental displacement or rotation sensor. The rotary movement of the pulley 29 is a measure of the speed of rotation of the top tool 10.

The right hand measuring module 26 possesses an inductive sensor 30, past or through which, during motion of the top tool 10, a magnetic measuring strip 21 attached to the guide 16 is moved. Instead of the measuring means described it is possible to employ other means, such as for example an inductive sensor with a perforated sheet metal tape or a rack, a linear potentiometer or a transparent rule with a photoelectric detector.

The working example illustrated in FIG. 1 provides for two different modules 25 and 26 for sensing the speed of the top tool 10, two identical measuring modules however being utilized in practice. The different representation of the measuring modules 25 and 26 is only intended to make it clear that this different types of measuring modules can be employed for finding the speed of the top tool 10. In addition to the two designs of measuring modules it is naturally possible to employ other designs of speed measuring module, which operate using other known principles of speed measurement. To take the simplest case it would be possible to employ only a single measurement module for speed.

Figure 2:
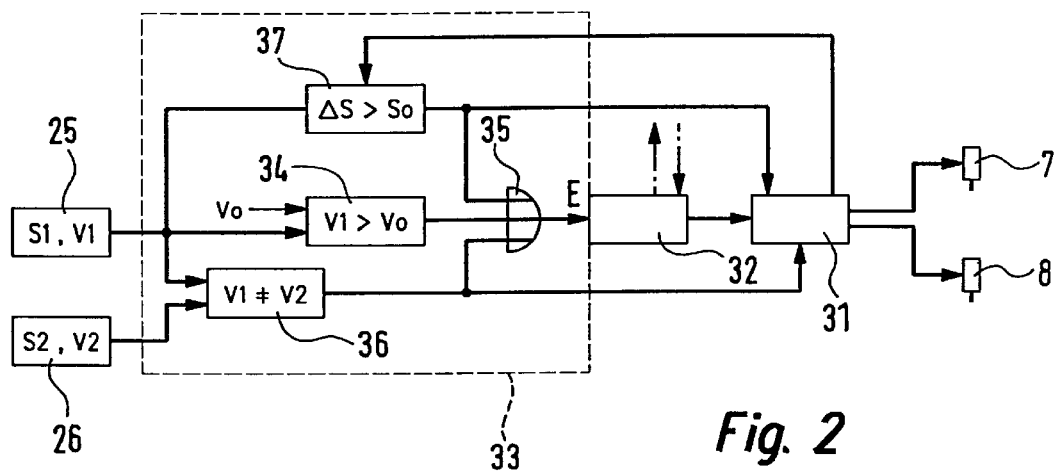
FIG. 2 is a diagrammatic block circuit diagram to explain the manner of operation.

The modus operandi of the guard means for the pressbrake depicted in figure will be explained in the following with reference to the block circuit diagram of FIG. 2. An electronic control device 31 controls the two hydraulic cylinders 7 and 8 and accordingly the movement of the top tool 10.

Initially, the control means 31 moves the top tool at a high speed as far as a position just short of the bottom tool 11 or, respectively, the sheet metal 14 to be worked and then switches over to a slower working speed at which such sheet metal 14 is shaped. The switching over to the slower speed in this case takes place intermediate the top tool 10 and the bottom tool 11 at a position in which the beam 23 has not yet been interrupted by the sheet metal or the bottom tool 11 so that a stop means 32, under the control of the photoelectric detector, will not yet have abruptly arrested the working movement of the top tool at the point in time of switching over to the lower working speed owing to interruption of the light beam 23 or of another light beam. In order to prevent taking place during the slow working stroke as well, in the case of which a limb of the operator could still be withdrawn owing to the low closing speed (equal to 10 mm/s) even prior to being clamped and in the case of which the light beams of the light beam arrangement is interrupted by the sheet metal 14 and/or the bottom tool 11, the stop means 32 is deactivated by a deactivating means 33, which possesses a speed comparison means 34. In the latter the measured speed V1 of the top tool 10 is compared with a lower threshold speed Vo, which is gone below in the case of movement at the slow working speed. The stop means 32 is accordingly only switched on or, respectively, activated, when the speed V1 of the top tool 10 is greater than the lower threshold speed Vo. It is only in this case that the speed comparison means 34 yields an output signal, by which by way of an OR gate 35 the stop means 32 is activated, something which in the opposite case means that it is deactivated under this threshold speed or in the case of a negative speed, that is to say during upward motion of the top tool 10.

The speed comparison means 34 accordingly causes automatically deactivating the stop means 32 on switching over to the low working speed and it causes it to remain deactivated in the course of the upward displacement of the top tool 10, that is to say, during return movement.

In the case of many processing operations the top tool is reset again within the safety distance, as from which switching over to the lower working speed takes place, in order then to perform a renewed working movement toward the bottom tool. In this case it is necessary to ensure that in the case of movements within this safety distance the stop means 32 remains deactivated, something which for example may be ensured by storage of that position, at which switching over to the lower working speed took place. It is only on movement past such stored position that the stop means 32 may be in principle activated again. If during the upward motion of the top tool the stop means 32 is in any case not activated, the it will be possible for this requirement to be automatically fulfilled.

The arrangement of two modules 25 and 26 serves to increase operational reliability. A comparison means 36 is provided in the deactivating means 33 for comparison of the measuring modules' 25 and 26 speed signals V1 and V2. If these signals are not identical, the stop means 32 will remain constantly activated by the output signal of such comparison means 36 by way of the OR gate 35. Simultaneously, the control means 31 for the hydraulic cylinders 7 and 8 is so driven by such output signal that a complete working stroke of the top tool 10 is prevented. This safety measure remains effective until the signals V1 and V2 are again the same, that is to say until a reliable measurement of speed takes place.

Lastly the deactivating means 33 also comprises a monitoring unit 37 for monitoring a maximum permissible overrun of the top tool 10 following a stop command. This maximum overrun displacement will for example amount to 10 mm. After turning on the electronic control means 31, the latter will produce a check signal for the monitoring unit 37, for example simultaneously with the first working movement. This check signal will mean that the instantaneous position of the top tool is stored and simultaneously the control means 31 will trigger stopping of the top tool 10. At the end of the stopping operation the position of the top tool 10 will be found and the difference, that is to say the overrun Δs will be ascertained. This overrun Δs is compared with the stored maximum overrun So. In the case of there being an excessive overrun Δs the stop means 33 will be activated by way of the OR gate 35 and held in the activate state. At the same time the corresponding output signal of the monitoring unit 37 acting via the control means 31 will cause the performance of a complete working movement. In this case the control means 31 will give rise to a further measuring operation for the further overrun in the case of the same or at least one following working movement. It is only when a correct overrun is measured that it is possible for the output signal of the monitoring unit 37 to be switched off or, respectively, deactivated again.

The measuring modules 25 and 26 described may serve both for detecting position signals and also for the detection of speed signals, the speed signals being able to be obtained by differentiating displacement signal.

Figure 3:
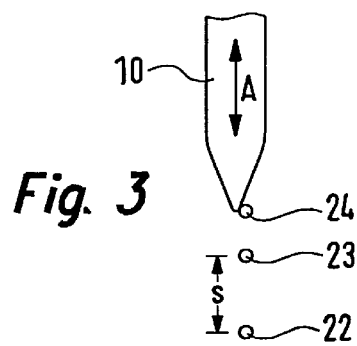
FIG. 3 is a diagrammatic representation of a photoelectric detector arrangement using three laser beams.

In FIG. 3 a part of the top tool 10 is illustrated in an end-on view and, respectively, in section, an enhanced photoelectric detector photoelectric detector arrangement using three superposed laser beams 22 through 24. The photoelectric detectors 19 and 20 may naturally be included in this photoelectric detector arrangement.

As compared with the already described laser beams 23 and 24 the laser beam 22 is further removed from the top tool 10, that is to say it is nearer the bottom tool 11. The distance between the laser beams 22 and 23 amounts to s. In a modified design of the block circuit diagram illustrated in FIG. 2, in cooperation with the arrangement depicted in FIG. 3 switching over to the lower working speed below the threshold speed Vo the stop means 32 is not completely deactivated and instead is merely deactivated for the laser beam 22. An interruption of such laser beam 22 can, after such partial deactivation, no longer lead to operation of the stop means 32. It is only when the top tool 10, following switching over to the slow working speed, has moved along a predetermined stroke, equal to or less than the displacement s, that there will be a complete deactivation of the stop means 32 so that same cannot be triggered by any interruption of one of the lasers 22 through 24.

The distance between the laser beam 23 and the laser beam 24 or, respectively, the top tool 10 amounts to 10 mm or less. The displacement s amounts to 5 to 15 mm and accordingly serves to guard against there being long braking displacement. s is set in accordance with the braking distance so that the top tool will f. i. be moving at the slow speed in any case before the laser beam 23 is interrupted by the bottom tool 11. The distance between the laser beams 23 and 24 is made so small by the designer that there is no danger of any part of the operator's body being introduced into the remaining narrow slot.

The guard means described is naturally not limited in its application to pressbrakes and sheet metal guillotines and indeed may be employed for all applications where machine parts move together and there is a chance of part of an operator's body being crushed between them. Furthermore the machine itself or parts thereof is also protected against damage by the safety switching off means, should other objects get in the way of the moving parts or tools of the machine and be likely to damage same. The guard means of the invention may for example be applied to stamping machines, automatically closing hinged or sliding doors, planing machines or the like.

What is claimed is:

1. A guard means for a manufacturing machine, the machine being composed of a first machine part that performs working movements toward a second machine part, said guard means comprising:

a photoelectric detector arrangement positioned between the first and second machine parts and attached to the first machine part, said detector arrangement producing at least one light beam;

a stop means adapted to halt working motion of the first machine part on interruption of a light beam;

a deactivating means adapted to deactivate the stop means, at least directly prior to interruption of the light beam by the second machine part;

a speed measuring means (25 and 26) for measuring the speed of the first machine part; and a control means (31) for controlling the working movement of the first machine part to reduce the speed of the first machine part immediately prior to interruption of the light beam by the second machine part to a speed below a predetermined threshold speed (Vo), wherein the deactivating means (33) comprises means (34) responsive to measurements performed by the speed measuring means for at least partly deactivating the stop means (32) when the measurements performed by the speed measuring means indicate that the speed of the first machine parts goes below the predetermined threshold speed (Vo).

2. The guard means as claimed in claim 1, wherein the deactivating means (33) comprises means (34) for deactivating the stop means (32) on movement of the first machine part away from the second machine part.

3. The guard means as claimed in claim 2, wherein the deactivating means (33) comprises means for the storage of the position of the first position part when the speed of the first machine part which during the working motion the threshold limit speed is gone below, and for deactivating the stop means (32) until the stored position is re-attained by the first machine part during movement of the first machine part away from the second machine part.

4. The guard means as claimed in claim 1, claim 2, or claim 3, wherein the speed measuring means (25 and 26) includes at least two independently operating measuring modules arranged at different points of the first machine part.

5. The guard means as claimed in claim 4, wherein the two independently operating measuring modules are arranged on two opposite end portions of the first machine part.

6. The guard means as claimed in claim 4, further comprising a comparison means (36) for comparing data from the two measuring modules and wherein the deactivating means (33) comprises means for preventing deactivation of the stop means (32) when the speeds measured by the two measuring modules differ from one another by more than a tolerance value.

7. (new) The guard means as claimed in claim 6, further comprising means for preventing a complete movement of the first machine part toward the second machine part when the speeds measured by the two measuring modules differ from one another by more than the tolerance value.

8. The guard means as claimed in claim 1, or claim 3, further comprising means (37) for automatically finding the overrun ($\Delta s$) of the first machine part following a stop signal at least during a first movement of the first machine part toward the second machine part, and wherein the deactivating means (33) comprises means for deactivating the stop means (32) when a predetermined maximum permissible overrun (So) is exceeded.

9. The guard means as claimed in claim 8, further comprising means for preventing a complete movement of the first machine part toward the second machine part when a predetermined maximum permissible overrun (So) is exceeded.

10. The guard means as claimed in claim 8, wherein the means (37) for automatically sensing the overrun of the first machine part (10) perform such sensing action repeatedly until a predetermined maximum permissible overrun (So) is detected.

11. The guard means as claimed in claim 1, wherein the speed measuring means (25 and 26) comprises at least one measuring module composed of one of: an incremental angular displacement sensor (29) having a cable (28); an inductive sensor (30) responsive to the movement of a magnetic strip (21) of a perforated sheet metal element or a rack; a transparent rule with a photoelectric detector; and a linear potentiometer.

12. The guard means as claimed in claim 11, further comprising at least one differentiating means provided for conversion of displacement signals produced by said measuring module into speed signals.

13. The guard means as claimed in claim 1, wherein the photoelectric detector arrangement produces at least two light beams at respectively different distances from the first machine part, and further comprising means for forestalling triggering of the stop means upon interruption of the photoelectric detector arrangement light beam (22) that is furthest from the first machine part when the speed of the first machine parts goes below the predetermined threshold speed (Vo), and a complete deactivation of the stop means (32) is only produced after a predetermined displacement (s) of the first machine part after switching over of the speed of the first machine part to below the threshold speed (Vo).

14. The guard means as claimed in claim 13, wherein the predetermined displacement (s) is equal to or smaller than the distance between the light beam (22) furthest from the first machine part (10 and the next nearest light beam (23).

* * * * *